June 1, 1965   W. M. TURLINGTON   3,186,728
MERCHANDISE CART
Filed July 30, 1963
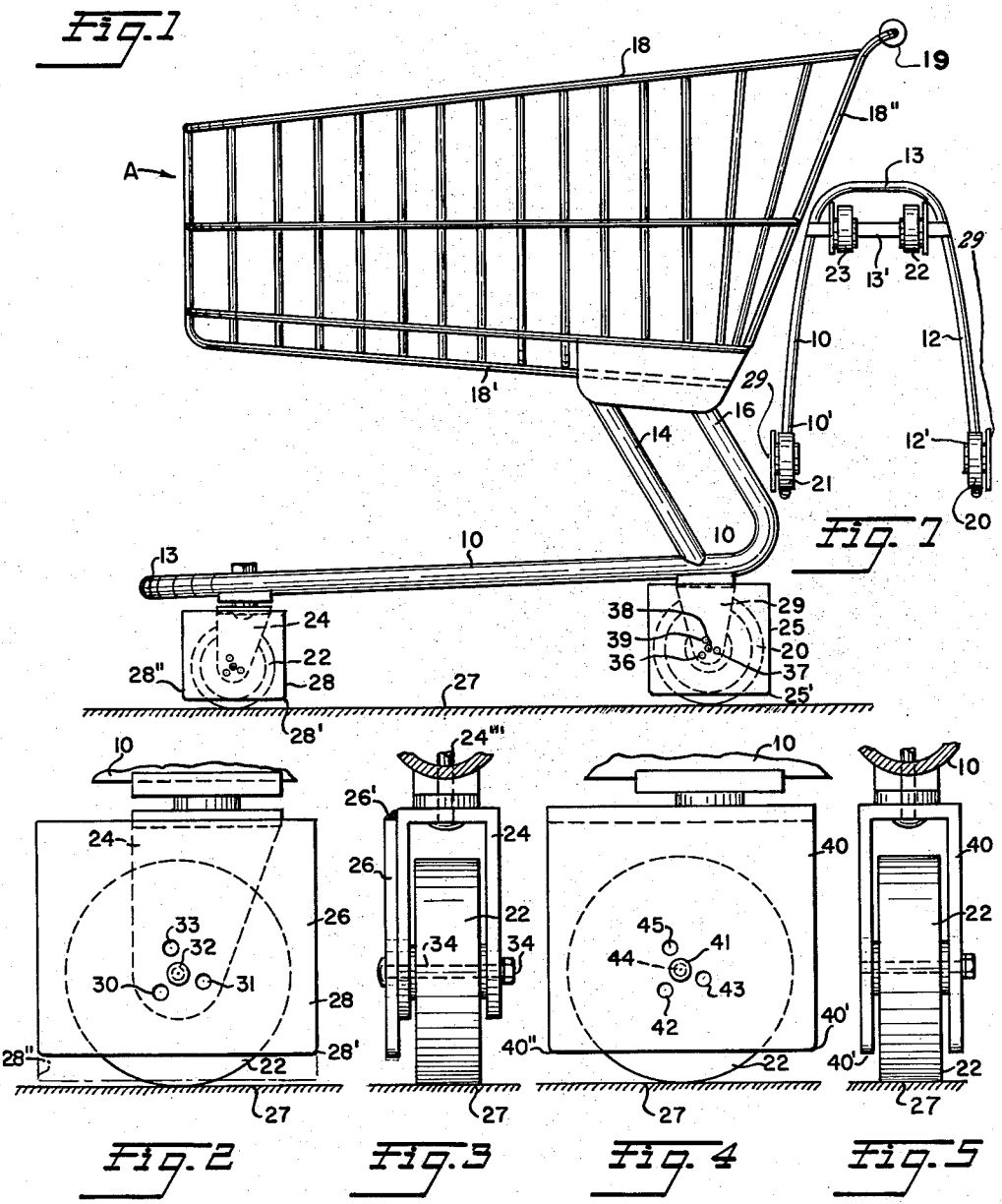
INVENTOR
WILLIAM M. TURLINGTON
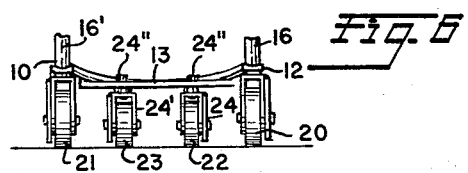
BY *Jwesley Everett*

United States Patent Office 3,186,728
Patented June 1, 1965

3,186,728
MERCHANDISE CART
William M. Turlington, 5612 Midwood Ave.,
Baltimore, Md.
Filed July 30, 1963, Ser. No. 298,614
1 Claim. (Cl. 280—33.99)

The present invention relates to a merchandise cart and in particular to a nesting type of cart, at present generally found about shopping centers and supermarkets for use by customers for transporting merchandise about the premises.

These carts are generally provided with at least two fixedly spaced rear wheels and two caster front wheels for supporting the cart on a supporting surface, such as, the floor of the establishment, and surrounding substantially smooth surfaces.

At the present time there is a high degree of loss in these carts. It is common to see these carts abandoned many blocks from the place of business, and it is often the practice of children to use these carts as scooters, coaster wagons and other riding vehicles.

The primary object of the invention is to provide a cart, wherein its structure is such, as to discourage its use outside the shopping center, or market place by providing surface engaging means for engaging upwardly extended portions of slightly uneven surface, making it difficult to operate the cart over pavements and streets having these slightly uneven surfaces, curbs and the like.

Another object of the invention is to provide a surface contacting means that is economical to manufacture or install and at the same time make one that is practical in its operation without changing drastically the design of the present cart, or interfering with the nesting thereof.

While several objects of the invention have been set forth, other objects and advantages will be more apparent as the nature of the invention is more fully disclosed, the same consisting of its novel construction, combination and arrangement of its several parts shown in the accompanying single sheet of drawings forming a part of the specifications to follow, in which:

FIGURE 1 is a view in side elevation of a merchandising cart showing the invention.

FIGURE 2 is an enlarged fragmentary side elevational view of the invention showing one form of the surface engaging means secured to the side of one of the wheel supporting elements.

FIGURE 3 is a rear view of the same.

FIGURE 4 is an enlarged fragmentary side elevational view of the invention shown in the form of a wheel supporting element adapted also to operate as a surface engaging means.

FIGURE 5 is a rear view of the same.

FIGURE 6 is a fragmentary rear view of the cart showing the spacing of the supporting wheels.

FIGURE 7 is an inverted plan view of the lower portion of the frame showing the relationship of the fixed rear wheels to the caster front wheels.

In describing the invention like reference numerals are used to point out like and similar parts throughout the several views.

In general, the invention has to do with a conventional type shopping cart whereby the cart is provided with, a frame, a basket supported on the frame and a handle for operating the cart. The design of the cart is such as to allow the carts to be nested one behind, or in front of the other, including wheels for supporting the cart. In order to nest the carts the back of the basket is hinged at its upper end, or top, and is movable upwardly when the front end of the basket behind is inserted into the back of the forward basket. The frame preferably has no lateral support in the vicinity of the rear portion of the frame, see FIGURE 7. The front of the cart is slightly narrower than the rear in order that the front of the cart may be insertable between the rear stationary wheel brackets. This allows the front portions of the frame to be receivable into the rear portion of the cart frame of the forward cart for the purpose of nesting.

Referring now to the drawings the cart A is provided preferably with a rugged tubular frame comprising two side portions 10 and 12 and a front portion 13, connecting the two side portions to provide a continuous rigid frame section. However, these cart frames are made in many styles and are sometimes constructed of a plurality of small solid rods. The tubular frame is bent or formed upwardly adjacent the rear thereof as shown by members 14, 16 and 16'. The upper ends of the members 14, 16 and 16' are connected to the bottom portion 18' of a metal basket 18. The rear end 18" of the basket 18 is provided with a hinged back (not shown) adjacent the top thereof and is movable inwardly and upwardly when a second basket is inserted in the process of nesting the carts. The object in the basket construction of these carts is to not have any cross or lateral supporting members between the sides of the basket. The bottom of the basket is slightly inclined upwardly in the direction of the front. In order to nest these carts the sides of the basket also must be tapered inwardly toward the front so that one basket must virtually fit within another basket from the back. The cart is provided with a handle 19 for manipulating the cart.

The invention per se relates in particular to a structure to be carried below the present styled side frame and in the vicinity of the supporting wheels of the cart. The present cart is shown with brackets 29 and 29' for supporting wheels 20 and 21 fixed to the rear of the frame, and caster wheels 22 and 23 adjacent the front of the carts which are normally supported by U shaped brackets 24 as shown in FIGURES 3, 6 and 7. To this U shaped bracket 24 there is welded a plate 26 as shown at 26'. The plate 26 extends outwardly in a plane parallel with the wheel to a point preferably in the vicinity of the perimeter of the wheel, as shown in FIGURES 1 and 2. However, the lower outer edges of the surface engaging element 28 extend in a horizontal plane below the wheel axis and laterally therefrom for a distance which is not less than one-half the radius of the wheel. The rear wheels 20 and 21 are supported upon a fixed U shaped bracket 29 similar to that just described for the front wheels, which also have a plate 25 similar to plate 26 welded thereto and adapted to function in substantially the same manner. The lower edges 25' of the plate 25 and the lower edges 28' and 28" are of such height from the supporting surface 27 as to provide for the operation of the cart over the average floor, or parking area, and are normally adjusted to a distance of approximately 9/16 of an inch from the supporting surface. The wheel supporting bracket 24 is provided with staggered holes 30, 31, 32 and 33 which are so positioned vertically as to raise, or lower, the wheels 9/16 of an inch between each of the holes. The wheel rotates about a bolt 34 which is adapted to be movable to any of the corresponding wheel adjusting holes 30 to 33. The rear wheel supporting bracket 29 is also provided with similar holes 36, 37, 38 and 39 for the same purpose as holes 30 to 33 first described for the bracket 24. While the cart is shown with two front caster wheels 22 and 23, there may only be a single wheel in some styles of carts.

In FIGURES 4 and 5 the wheel is shown with a holding bracket 40 which is so formed as to have at least one of its lower edges 40' and/or 40" carried within a short distance of the supporting surface 27 which may extend to either one or both sides of a vertical line passing through the wheel axis and at a lateral distance therefrom, for at least to place the lower edge 40' and/or 40" in the vicinity of the perimeter of the wheel adjacent its horizontal axis. The wheel 22 is supported within the U shaped bracket 40 by a suitable bolt 41 and the wheel is adjustable relative to the vertical height of the frame by the holes 42, 43, 44 and 45.

While the surface engaging element is shown in the form of a plate, it may take other forms, such as, a U shaped inverted bracket (or an inverted T bar (not shown) etc.) but would have certain portions positioned as are the lower corners 28', 28", 25' and 25" of the plates 28 and 25 which would give the same effect.

The surface engaging elements are preferably positioned beneath the frame members 10 and 12 or outwardly of a vertical plane passing along the inner edge of the frame in order that they will not interfere with the nesting of the carts.

With the present arrangement a cart of the present type may be nested in the customary manner and still be adapted to a very restricted use.

The surface contacting elements are preferably used adjacent all the wheels, but in particular on the rear wheels.

As stated hereinbefore, the surface engaging elements as shown and arranged restrict or discourage the use of these carts for purposes other than what they were intended, and for taking the carts off the premises to distant places where they may be abandoned or misused.

While the invention is shown in a specific form, it is not intended as a limitation as various changes in form may be made without departing from the general principles involved and therefor the scope of the invention is best defined in the appended claim.

I claim:

A cart for transporting merchandise comprising, in combination:

(a) a rigid frame having at least two substantially horizontal lower side portions extending throughout the length of the cart including a front end and a rear end, the two lower tubular side portions of the frame having portions extending upwardly from the rear end of the lower horizontal side portions;

(b) a basket supported on the upwardly extended side portions and above the lower horizontal side frame portions;

(c) a fixed wheel supporting means permanently and rigidly fixed to the rear end of each of the horizontal lower tubular side portions for receiving and supporting a rotatable wheel and a combination caster and wheel support adjacent the front of the lower horizontal frame portion, said wheels adapted to support the cart upon a supporting surface;

(d) the wheel supporting means adjacent the rear of the frame extending along and adjacent the side of each wheel;

(e) a rigid surface engaging member in the form of a plate positioned adjacent each of the rear supports and in a plane parallel with the wheel, and permanently fixed to the wheel supports, each plate having its lower lateral edges terminating in a predetermined horizontal plane extending below the wheel axle, the front and rear edges of the plate extending outwardly from each side of the wheels for a substantial distance in the direction of the rim of the wheel, beyond the wheel rim, whereby the surface engaging members attached to the rear end of the lower tubular member are adapted to engage irregularities in the supporting surface beyond a predetermined height.

References Cited by the Examiner

UNITED STATES PATENTS

| 2,450,062 | 9/48 | Voss et al. | 16—18 |
| 2,447,582 | 8/48 | Klumb | 16—18 |
| 2,483,241 | 9/49 | Sheperd | 16—18 |
| 2,823,042 | 2/58 | Gelbond | 280—33.99 |
| 2,834,608 | 5/58 | Wixson. | |
| 2,996,752 | 8/61 | Pope | 16—18 |
| 3,083,398 | 4/63 | Swalm. | |

A. HARRY LEVY, *Primary Examiner.*